United States Patent
Kim et al.

(10) Patent No.: US 7,027,113 B2
(45) Date of Patent: Apr. 11, 2006

(54) LIQUID CRYSTAL DISPLAY DEVICE USING DUAL LIGHT UNITS

(75) Inventors: Kyeong Jin Kim, Gyeongsangbuk-do (KR); Hoon Kang, Gyeongsangbuk-do (KR); Mi Kyoung Jang, Busan-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 67 days.

(21) Appl. No.: 10/878,128

(22) Filed: Jun. 29, 2004

(65) Prior Publication Data

US 2005/0041176 A1    Feb. 24, 2005

(30) Foreign Application Priority Data

Aug. 22, 2003 (KR) ............... 10-2003-0058194

(51) Int. Cl.
*G02F 1/13* (2006.01)
(52) U.S. Cl. ............... 349/63; 349/64; 349/65
(58) Field of Classification Search ............ 349/62–65, 349/114
See application file for complete search history.

(56) References Cited

U.S. PATENT DOCUMENTS

| | | | |
|---|---|---|---|
| 2001/0004275 A1* | 6/2001 | Umemoto et al. | 349/65 |
| 2001/0007489 A1* | 7/2001 | Umemoto et al. | 349/113 |
| 2003/0043315 A1* | 3/2003 | Umemoto et al. | 349/65 |
| 2005/0046768 A1* | 3/2005 | Wu | 349/65 |

FOREIGN PATENT DOCUMENTS

| | | |
|---|---|---|
| EP | 1113310 A2 | 7/2001 |
| KR | 1020010095035 A | 11/2001 |
| KR | 1020030047575 A | 6/2003 |

* cited by examiner

*Primary Examiner*—James A. Dudek
(74) *Attorney, Agent, or Firm*—Birch, Stewart, Kolasch & Birch, LLP

(57) ABSTRACT

An LCD includes a liquid crystal panel, first and second polarizing plates attached to opposing surfaces of the liquid crystal panel, a first front light unit over a front side of the liquid crystal panel, a second front light unit over a rear side of the liquid crystal panel, a first film disposed between the first polarizing plate and the first front light unit, for receiving a surrounding light and directing the surrounding light toward the rear side of the liquid crystal panel, and a diffusion sheet disposed between the second polarizing plate and the second front light unit.

31 Claims, 9 Drawing Sheets

LIQUID CRYSTAL DISPLAY DEVICE USING DUAL LIGHT UNITS

This application claims the benefit of the Korean Application No. P2003-58194, filed on Aug. 22, 2003, which is hereby incorporated by reference.

BACKGROUND OF THE INVENTION

1. Field of the Invention

The invention relates to a liquid crystal display device (LCD) having dual light units.

2. Description of the Related Art

In general, LCDs are flat panel display device having a relatively small size, slim profile, and low power consumption. Accordingly, LCDs find common use in mobile computers, such as notebook computers, office automation machines, and audio/video machines.

An LCD displays images by manipulating the transmission of light through a liquid crystal material by controlling an electric field induced through the liquid crystal material. The LCD does not necessarily emit the light by itself, but makes use of an external light source. Other display devices, such as electro-luminescences (ELs), cathode ray tubes (CRTs), and light emitting diodes (LEDs), emit light on their own.

LCDs can be generally classified into two different categories: transmission-type LCDs and reflective-type LCDs. A transmission-type LCD includes a liquid crystal panel having a liquid crystal layer interposed between two substrates. In addition, the transmission-type LCD includes a back light unit that supplies light to the liquid crystal panel. However, it is difficult to manufacture the transmission-type LCDs having slim profiles and light weight due to the volume and the weight of the back light unit. In addition, the back light unit requires large amounts of electrical power. This large electric power requirement shortens the amount of time a LCD computer notebook can run on battery power.

The reflective-type LCDs are not separately provided with light sources, but display images depending on natural (ambient) light conditions. The reflective-type LCDs thus do not require any additional light sources, and the reflective-type LCDs consume small amounts of electrical power and find wide employment in mobile display devices, such as electronic notes and personal digital assistants (PDAs). However, when the ambient light is insufficient, i.e. at night, the brightness level of the reflective LCDS decreases, whereby the information displayed cannot be read. Conventional methods of overcoming this problem of displaying images under dark conditions include installing a front light unit in the reflective LCDs.

FIG. 1 shows a perspective schematic diagram of a related art reflective-type LCD using a front light unit, and FIG. 2 shows a cross sectional view of the reflective-type LCD of FIG. 1. In FIGS. 1 and 2, a reflective LCD 100 includes a reflective liquid crystal panel 120, and a front light unit 110 positioned on the reflective liquid crystal panel 120 provides light. The reflective liquid crystal panel 120 is provided with a first substrate 121 and a second substrate 122, and a diffusing reflective electrode 123 is formed on the second substrate 122. The diffusing reflective electrode 123 reflects ambient light supplied from an upper surface of the reflective liquid crystal panel 120 or reflects incident light emitted from the front light unit 110.

The front light unit 110 includes a light source 111, a light guide plate 112, and a reflective mirror 113. The light source 111 generates light. The light guide plate 112 projects the light onto a display surface of the reflective liquid crystal panel 120. The reflective mirror 113 reflects the light generated from the light source 111 to the light guide plate 112.

FIG. 2 shows the upper surface of the light guide plate 112 being formed to have a prismatic configuration such that the light supplied from the light source 111 is reflected by an upper surface and a lower surface of the light guide plate 112. The light supplied to the light guide plate 112 is then supplied along a direction perpendicular to the reflective liquid crystal panel 120 positioned below the light guide plate 112. Next, the light supplied vertically to the reflective liquid crystal panel 120 is reflected by a reflective electrode 123 of the reflective liquid crystal panel 120, and the light travels upward over the light guide plate 110, thereby displaying an image. As a result, the related art technology produces a display that can only show an image on one side of the display.

SUMMARY OF THE INVENTION

Accordingly, the invention is directed to an LCD using dual light units that substantially obviates one or more problems due to limitations and disadvantages of the related art.

An object of the invention is to provide an LCD that uses a single liquid crystal panel to display images on both front and rear sides.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention, in part, pertains to an LCD that includes a liquid crystal panel; first and second polarizing plates attached to opposing surfaces of the liquid crystal panel; a first front light unit attached over a front side of the liquid crystal panel; a second front light unit attached over a rear side of the liquid crystal panel; a first film disposed between the first polarizing plate and the first front light unit, receiving a surrounding light and directing the surrounding light toward the rear side of the liquid crystal panel; and a diffusion sheet disposed between the second polarizing plate and the second front light unit.

The invention, in part, pertains to an LCD that includes a liquid crystal panel; first and second polarizing plates attached over opposing surfaces of the liquid crystal panel; a first front light unit attached over a front side of the liquid crystal panel; a partial reflector attached over a front side of the first front light unit; a second front light unit attached over a rear side of the liquid crystal panel; a first film disposed between the first polarizing plate and the first front light unit, receiving a surrounding light and directing the surrounding light toward the rear side of the liquid crystal panel; and a diffusion sheet disposed between the second polarizing plate and the second front light unit.

It is to be understood that both the foregoing general description and the following detailed description of the invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION

Reference will now be made in detail to the preferred embodiments of the invention, examples of which are illustrated in the accompanying drawings.

Figure 1:
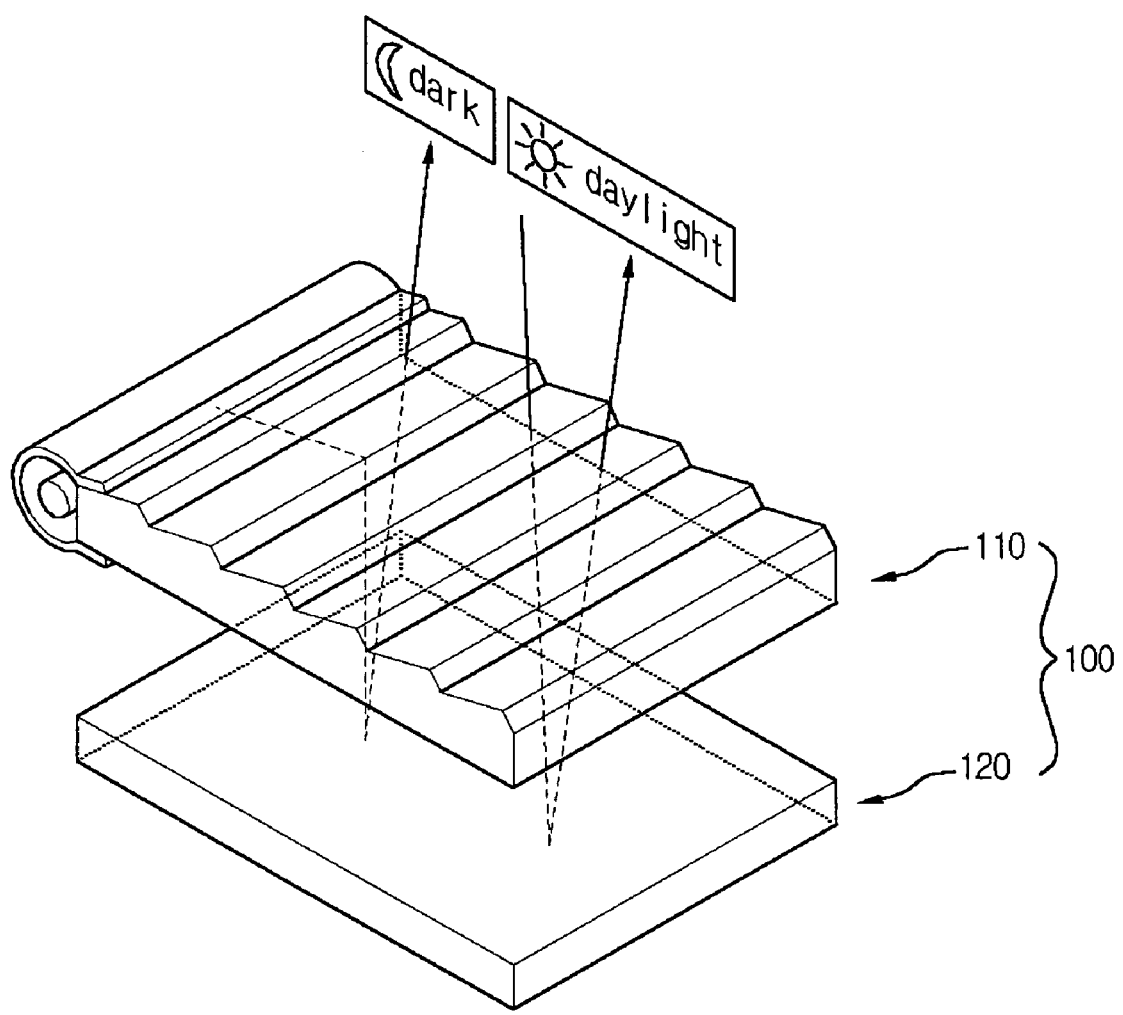
FIG. 1 shows a perspective schematic diagram of a related art reflective LCD using a front light unit.
Figure 2:
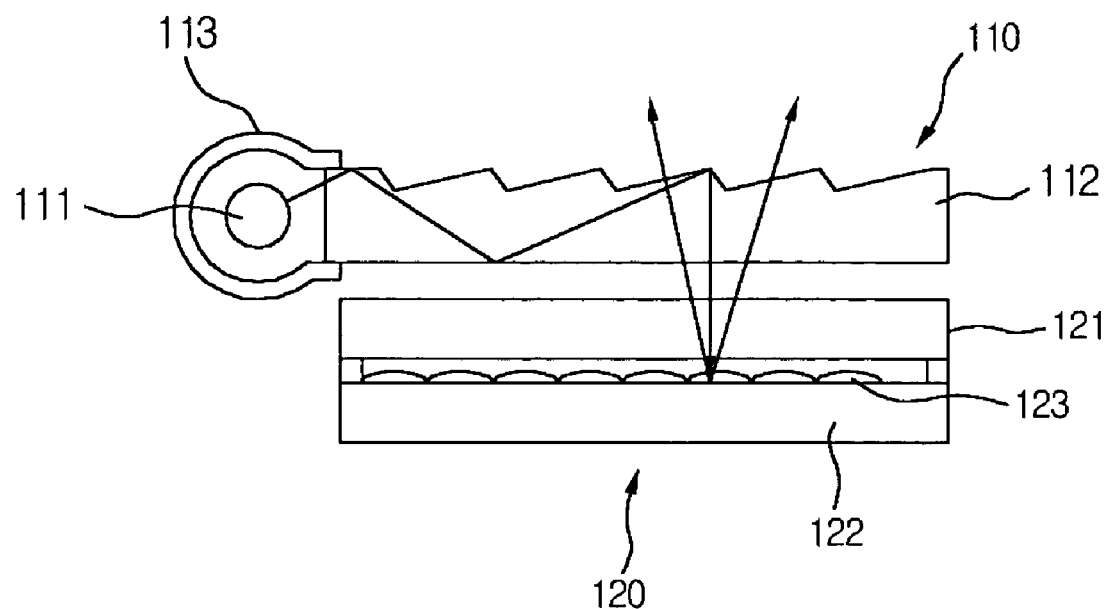
FIG. 2 shows a cross sectional view of the related art reflective LCD of FIG. 1 using a front light unit.
Figure 3:
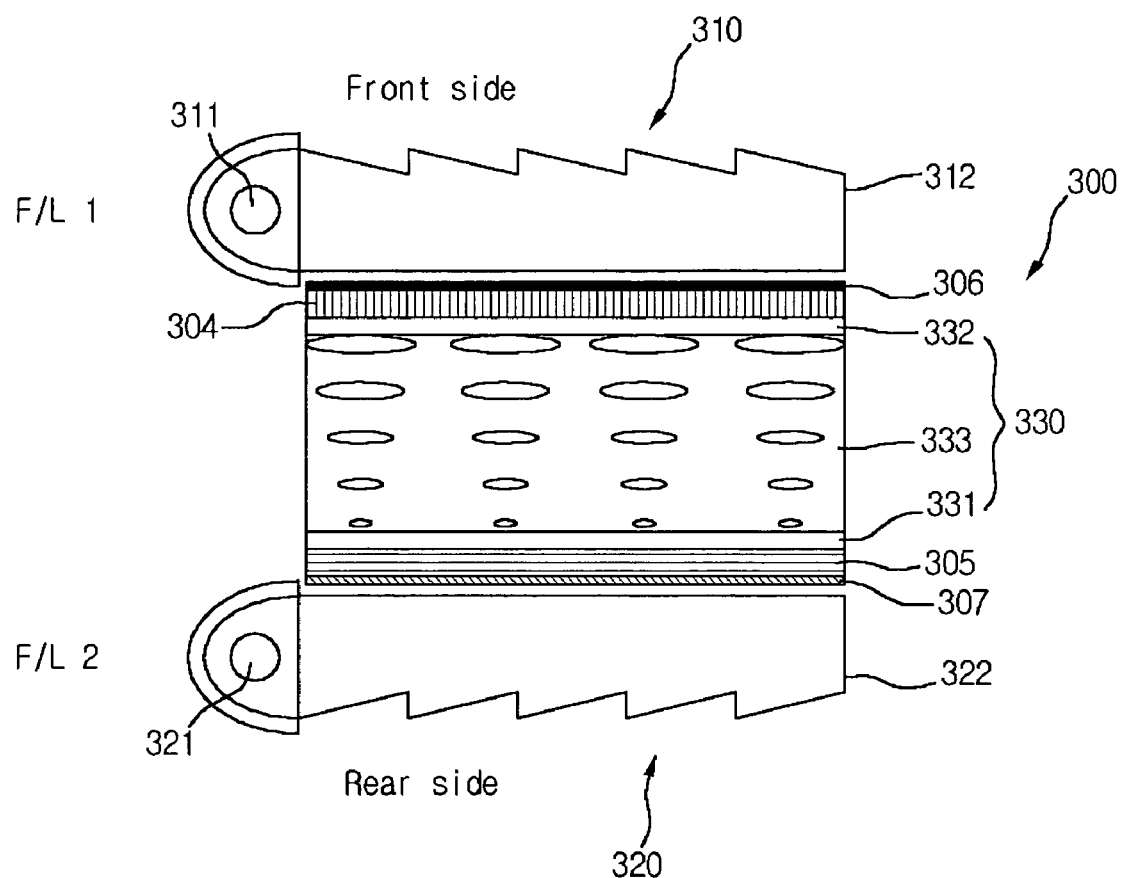
FIG. 3 shows a schematic cross sectional view of an exemplary LCD using dual light units according to a first embodiment of the invention.

FIG. 3 shows a schematic cross sectional view of an exemplary LCD using dual light units according to a first embodiment of the invention.

FIG. 3 shows an LCD 300 that includes a liquid crystal panel 330, which is formed by interposing a liquid crystal layer 333 between a first substrate 331 and a second substrate 332. First and second polarizing plates 304 and 305 are attached to opposing surfaces of the liquid crystal panel 330, and a first front light unit 310 attaches to a front side of the liquid crystal panel 330. A second front light unit 320 attaches to a rear side of the liquid crystal panel 330.

The LCD 300 also includes a first film 306 disposed between the first polarizing plate 304 and the first front light unit 310, and a second film 307 disposed between the second polarizing plate 305 and the second front light unit 320. The characteristics of the first film 306 and the second film 307 will be described later in detail.

The liquid crystal panel 330 is a transmission-type liquid crystal panel. The first substrate 331 is provided with thin film transistors (TFTs), and the second substrate is provided with a color filter layer. The first substrate 331 opposes the second substrate 332 spaced apart by a predetermined distance from the first substrate 331.

The first substrate 331 is provided on an inner surface thereof with gate bus lines and data bus lines arranged in a matrix configuration. TFTs functioning as a switching element are formed at cross points of the gate bus lines and the data bus lines. Square shaped pixel electrodes are formed on pixel regions enclosed by the gate bus lines and the data bus lines.

The TFTs formed on the first substrate 331 of the liquid crystal panel 330 can be classified, according to phases of the semiconductor layer as an active layer, into two different categories: i) amorphous TFTs using hydrogen-contained amorphous silicon not having periodicity of lattice, and ii) polysilicon TFTs using polycrystalline silicon.

Also, the second substrate 332 opposes the first substrate 331 and includes a black matrix (BM) layer, a color filter layer and a common electrode formed over an inner surface thereof.

In the above-described liquid crystal panel, applying a voltage to a selected gate bus line and a selected data bus line turns on a TFT connected to the selected gate bus line, and charges accumulate on a pixel electrode connected to the drain electrode of the TFT, thereby changing the angle of liquid crystal molecules between the pixel electrode and the common electrode.

The liquid crystal panel displays thus pictures or images by controlling electric field applied to the liquid crystal molecules having dielectric anisotropy. The liquid crystals can have positive or negative dielectric anisotropy. Typically, a nematic liquid crystal having positive dielectric anisotropy is used. Although FIG. 3 illustrates an example of twisted nematic (TN) mode, other modes such as an electrically controlled birefringence (ECB) mode, an optically compensated birefringence (OCB) mode or the like may be employed.

A first polarizing plate 304, second polarizing plate 305 and a compensation plate (not shown) are also provided over outer surfaces of the liquid crystal panel 330. The first polarizing plate 304 and the second polarizing plate 305 are attached over the outer surfaces of the liquid crystal panel 330 such that the optical axis of the first polarizing plate 304 lies perpendicular to the optical axis of the second polarizing plate 305. The first and second polarizing plates 304 and 305 pass only the light vibrating, i.e., oriented, in one direction, thereby polarizing the natural light.

The compensation plate (not shown) compensates for variations in phase of light in an opposite direction, thereby resolving the viewing angle problem. A uniaxial compensation plate or biaxial compensation plate forms the compensation plate.

Meanwhile, the first front light unit 310 disposed on a front side of the liquid crystal panel 330 converts linear light into a surface light, while the light emitted from a light source 311 passes through the light guide plate 312. The light guide plate 312 is formed from a transparent material with a prism pattern formed on an upper surface thereof, and it changes the progressive path of light that is incident with an inclined angle to a direction perpendicular to the display surface. The second front light unit 320 also has a light source 321 and light guide plate 322 of the second front light unit 320, respectively.

When an image is displayed on the rear side of the liquid crystal panel 330 by the light emitted from the first front light unit 310, the first film 306 passes the light polarized in a first optical axis direction toward the liquid crystal panel 330, and the first film 306 reflects the light polarized in a second optical axis direction perpendicular to the first optical axis direction. The light polarized in the second optical axis direction is again reflected by the light guide plate 312 of the first front light unit 310 and then partially passes through the liquid crystal panel 330, thereby enhancing the brightness of image displayed on the rear side of the liquid crystal panel 330. A reflective polarizing plate or dual brightness enhancement film (DBEF) may be used as the first film 306.

Also, the first film 306 may function as a mirror when the first front light unit 310 and the second front light unit 320 are in Off-state.

A diffusion sheet may be used as the second film 307. The second film 307 makes the brightness of the light supplied through the light guide plate 312 from the light source 311 uniform.

Figure 4:
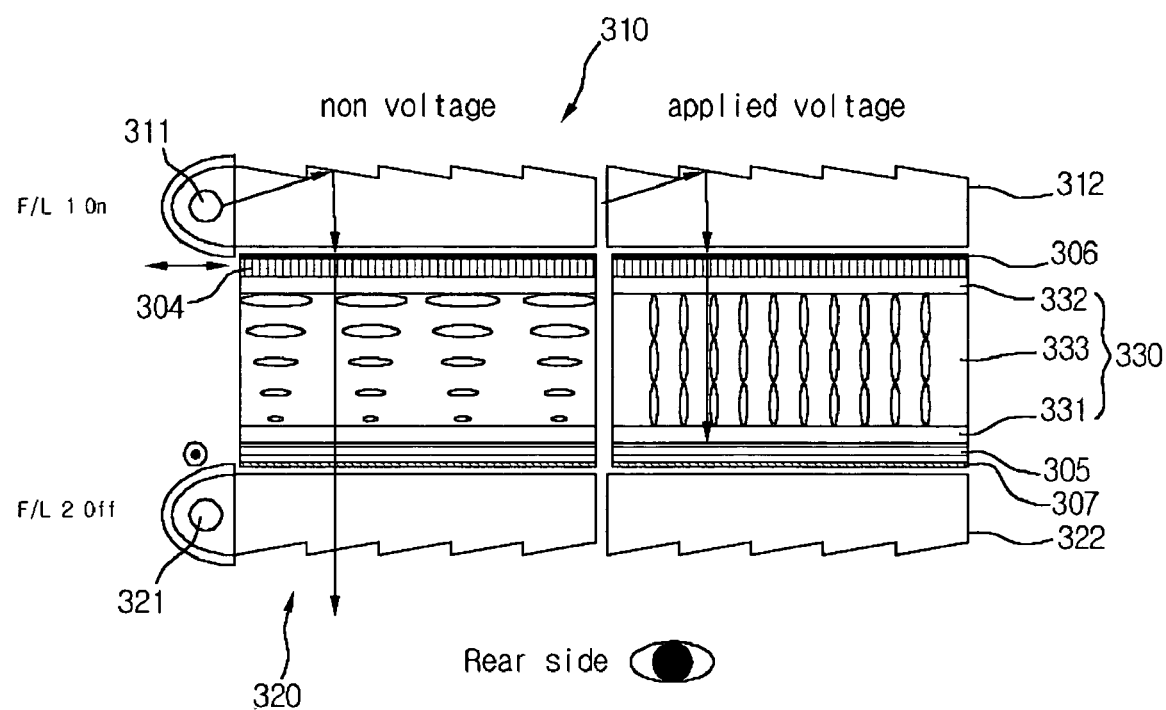
FIGS. 4 and 5 show schematic cross sectional views of another exemplary LCD using dual light units according to the invention.

FIG. 4 illustrates an image display in an inventive LCD when the first front light unit 310 is in On-state.

FIG. 4 shows that when the first front light unit 310 is in the On-state and a voltage is not applied to the liquid crystal panel 330, light that has passed through the first polarizing plate 304 travels along a twisted path of the liquid crystal molecules, and the light passes through the second polarizing plate 305 having the optical axis perpendicular to the optical axis of the first polarizing plate 304. Accordingly, an image displays on the liquid crystal panel 330 in a white mode.

Thus, when a voltage is not applied, the light emitted from the first front light unit 310 passes through the liquid crystal panel 330, and the rear side of the liquid crystal panel 330 is in normally white mode.

However, when a voltage is applied to the liquid crystal panel 330 shown in FIG. 4, the liquid crystal molecules orient along an electric field direction so that the light that passes through the first polarizing plate 304 does not pass through the second polarizing plate 305 but is blocked by the second polarizing plate 305. In other words, when a voltage is applied, the second polarizing plate 305 blocks the light, and the rear side of the liquid crystal display device 330 accordingly operates in a black mode.

Thus, by selectively applying a voltage to the liquid crystal panel 330, one can control light passing through the liquid crystal panel 330 to display a desired image on the rear side of the liquid crystal panel 330.

When an image is displayed on the rear side of the liquid crystal panel 330, the first film 306 permits light polarized in the first optical axis direction to pass through the liquid crystal panel 330. Meanwhile, the first film 306 reflects light polarized in the second optical axis direction perpendicular to the first optical axis direction. Then, the reflected light is again reflected by the light guide plate 312 of the first front light unit 310 and partially passes through the liquid crystal panel 330. The brightness of the image displayed on the rear side of the liquid crystal panel 330 can accordingly be enhanced.

Figure 5:
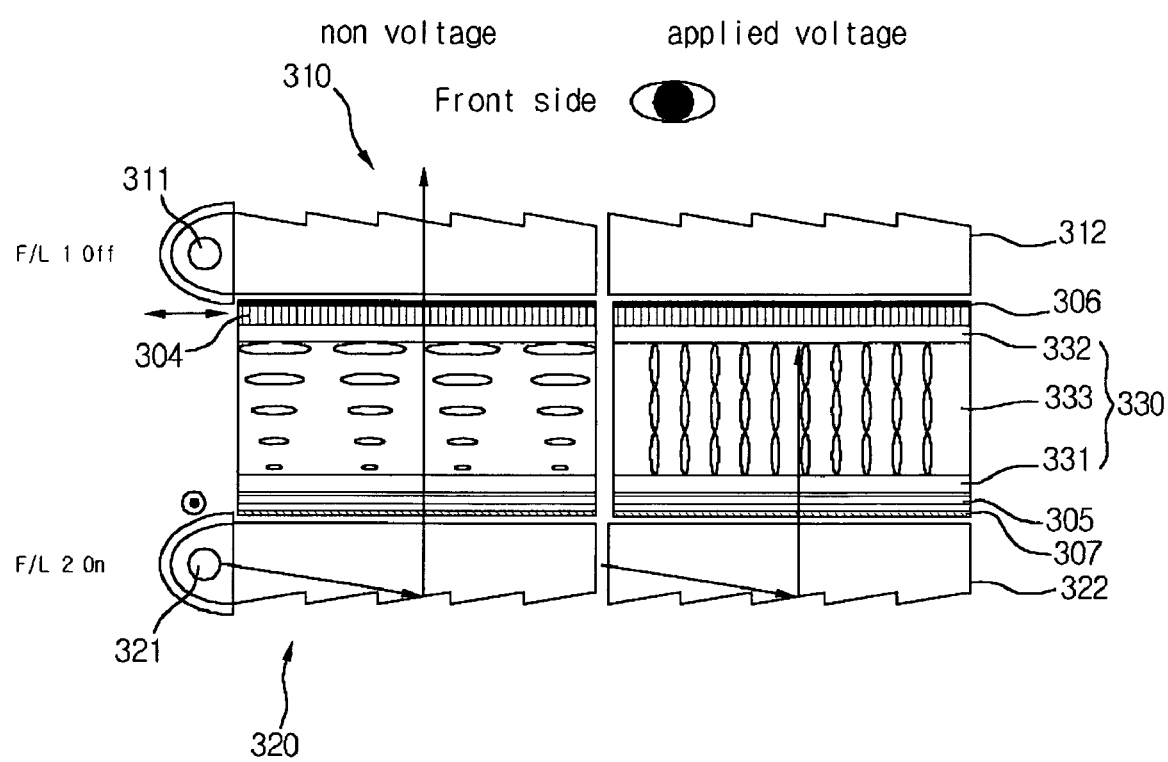

FIG. 5 illustrates an image display in an LCD according to the invention when the second front light unit 320 is in On-state.

FIG. 5 shows that when the second front light unit 320 is in On-state and a voltage is not applied to the liquid crystal panel 330, light that has passed through the second polarizing plate 305 travels along a twisted path of the liquid crystal molecules and passes through the first polarizing plate 304 having the optical axis perpendicular to the optical axis of the second polarizing plate 305. The liquid crystal panel 330 accordingly operates in the normally white mode.

When a voltage is not applied, the light emitted from the second front light unit 320 passes through the liquid crystal panel 330, and an image is displayed on the front side of the liquid crystal panel 330 in a white mode.

However, when a voltage is applied to the liquid crystal panel 330, the liquid crystal molecules orient along the electric field direction so that light that has passed through the second polarizing plate 305 does not pass through the first polarizing plate 304, but is instead blocked by the first polarizing plate 304. In other words, the first polarizing plate 304 blocks light when a voltage is applied, and the front side of the liquid crystal display device 330 operates in a black mode.

Thus, by selectively applying a voltage to the liquid crystal panel 330, one can control light passing through the liquid crystal panel 330 to display a desired image on the front side of the liquid crystal panel 330.

In other words, as shown in FIGS. 4 and 5, it becomes possible to display an image on the front side or the rear side of the liquid crystal panel 330 depending on whether the first front light unit 310 or the second front light unit 320 is turned on or off.

Figure 6:
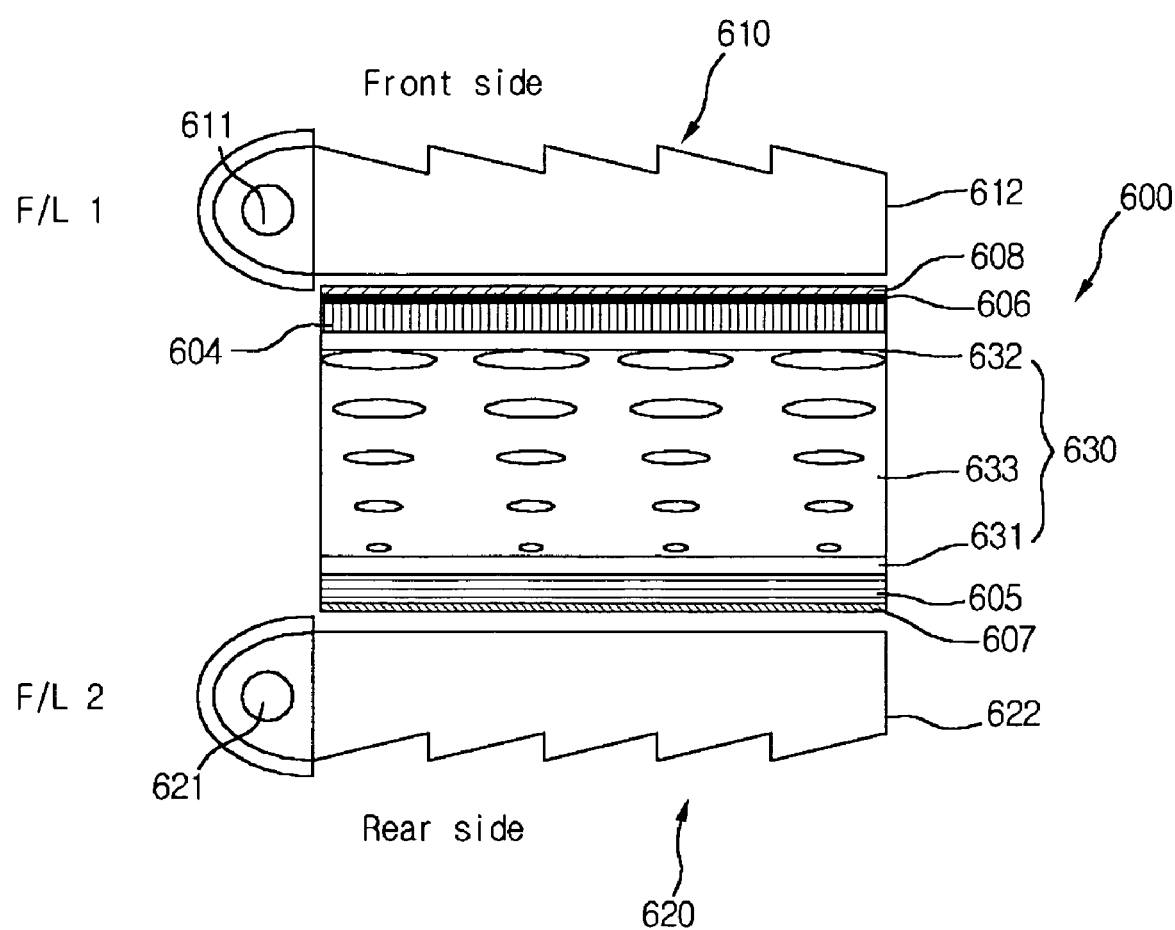
FIG. 6 shows a schematic cross sectional view of an exemplary LCD using dual light units according to a second embodiment of the invention.

FIG. 6 shows a schematic cross sectional view of an exemplary LCD using dual light units according to a second embodiment of the invention.

FIG. 6 shows an LCD 600 that includes a liquid crystal panel 630, which is formed by interposing a liquid crystal layer 633 between a first substrate 631 and a second substrate 632, and first and second polarizing plates 604 and 605 attached to opposing surfaces of the liquid crystal panel 630. A first front light unit 610 attaches to a front side of the liquid crystal panel 630, and a second front light unit 620 attaches to a rear side of the liquid crystal panel 630.

The LCD 600 further includes a first film 606 disposed between the first polarizing plate 604 and the first front light unit 610, a second film 607 disposed between the second polarizing plate 605 and the second front light unit 620, and a scattering film 608 disposed between the first front light unit 610 and the first film 606.

When an image is displayed on the rear side of the liquid crystal panel 630, the scattering film 606 prevents Moire phenomena from being generated by the pattern of the light guide plate 612 of the first front light unit 610.

Moire phenomena is indicated by an interference fringe, which forms when two or more periodic patterns overlap each other. For example, when light radiates onto two or more lattices having a similar interval, a line fringe that is different than the two lattices is formed. This line fringe is a Moiré phenomenon.

The LCD of FIG. 6 depicts other elements that are similar in their functions to those of the LCD shown in FIGS. 3 through 5, and their detailed description will be omitted. In FIG. 6, a light source 611 is provided in the first front light unit 610, and a light source 621 and a light guide plate 622 are provided in the second front light unit 620.

Figure 7:
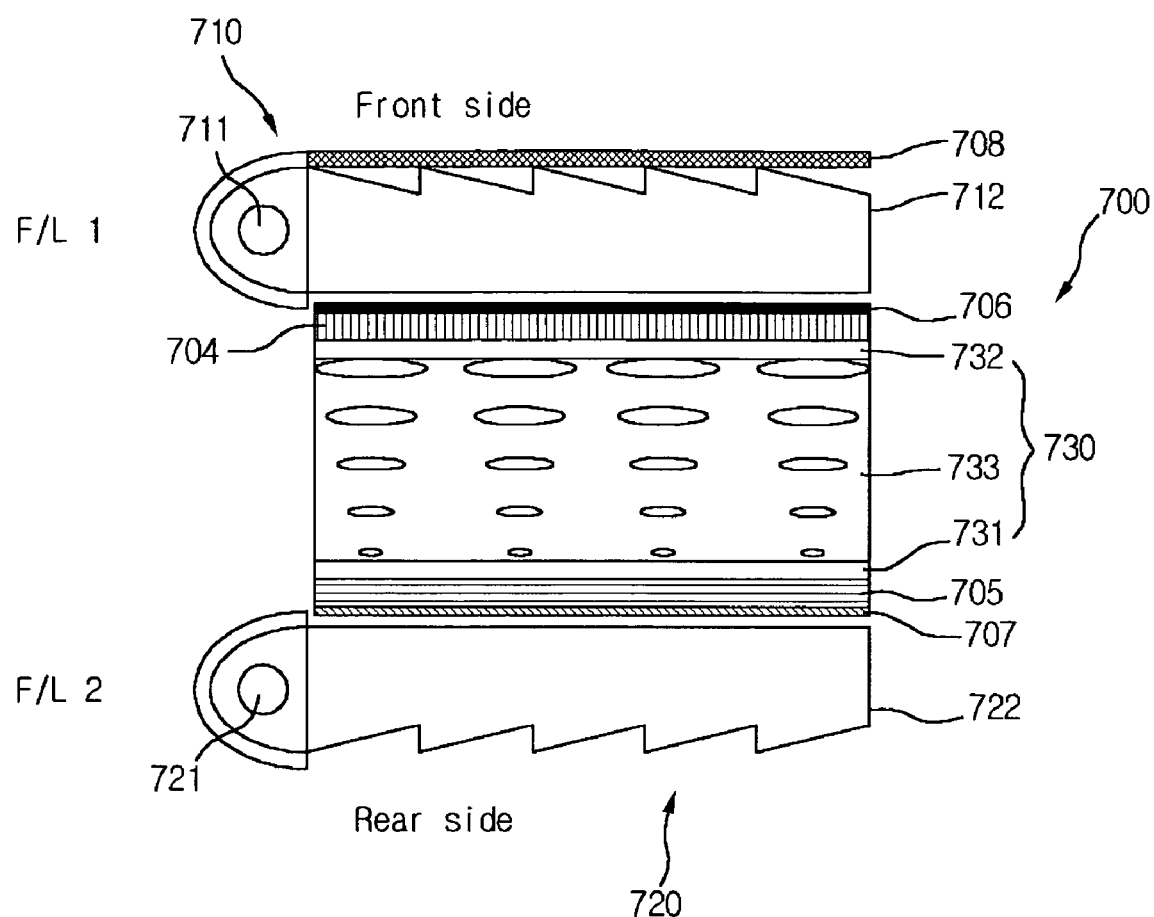
FIG. 7 shows a schematic cross sectional view of an exemplary LCD using dual light units according to a third embodiment of the invention.

FIG. 7 shows a schematic cross sectional view of an exemplary LCD using dual light units according to a third embodiment of the invention.

FIG. 7 shows a LCD 700 that includes a liquid crystal panel 730, which is formed by interposing a liquid crystal layer 733 between a first substrate 731 and a second substrate 732. First and second polarizing plates 704 and 705 are attached to opposing surfaces of the liquid crystal panel 730. A first front light unit 710 attaches to a front side of the liquid crystal panel 730, and a second front light unit 720 attaches to a rear side of the liquid crystal panel 730.

The LCD 700 also includes a first film 706 disposed between the first polarizing plate 704 and the first front light unit 710, a second film 707 disposed between the second polarizing plate 705 and the second front light unit 720, and a partial reflector 708 attached over a front surface of the first front light unit 710.

The partial reflector 708 may be formed by coating a metal film having a reflectivity of about 50–90% with respect to an external incident light (thereby forming a half-mirror), or using a dual brightness enhancement film (DBEF). The metal film can be formed from a material such as silver, aluminum or any other suitable metal.

A reflective polarizing plate may be used as the first film 706. Also, a DBEF or an ultra brightness film (UBF) may be employed for the first film 706.

When the reflective polarizing plate constitutes the first film 706, and an image is displayed on the rear side of the liquid crystal panel 730 by the light emitted from the first front light unit 710 as an inner light source, the first film 706 permits light polarized in the first optical axis direction to pass through the liquid crystal panel 730. However, the first film 706 reflects the light polarized in the second optical axis direction perpendicular to the first optical axis direction. The light guide plate 712 of the first front light unit 710 again reflects the light polarized in the second optical axis direction. This re-reflected light partially passes through the liquid crystal panel 730, thereby enhancing the brightness of the image displayed on the rear side of the liquid crystal panel 730.

When a UBF is used as the first film 706, the first film 706 reflects incident light by an angle θ with respect to external light sources, thereby enhancing the efficiency of light passing through the liquid crystal panel 730 to increase the brightness of the image displayed on the rear side of the liquid crystal panel 730.

Also, the partial reflector 708 may be used as a mirror when the first front light unit 710 and the second front light unit 720 are in the Off-state.

The second film 707 may be formed from a diffusion sheet may. The second film 707 functions to make uniform the brightness of the light supplied through the light guide plate 712 from the light source 711.

Each of the first front light unit 710 and the second front light unit 720 employs LED chips. The number of the LED chips used in the first front light unit 710 can be made different from the number of the LED chips used in the second light unit 720, and the power consumption can thereby be minimized.

For example, three LED chips are used in the first front light unit 710 for supplying light to the rear side of the liquid crystal panel 730, and two LED chips are used in the second front light unit 720 for supplying light to the front side of the liquid crystal panel 730 used as a sub-window. This results in a three to two (3:2 or 1.5) ratio. However, the invention is not restricted to this number of LED chips and ratio.

Of course, an equal number of LED chips may be applied to each of the first front light unit 710 and the second front light unit 720.

The LCD 700 depicted in FIG. 7 has other elements that are similar in their functions to those in the LCD shown in FIGS. 3 through 5, and their detailed description will be omitted. The LCD of FIG. 7 also shows a light source provided 711 in the first front light unit 710, a light source 721 and a light guide plate 722 provided in the second front light unit 720.

Figure 8:
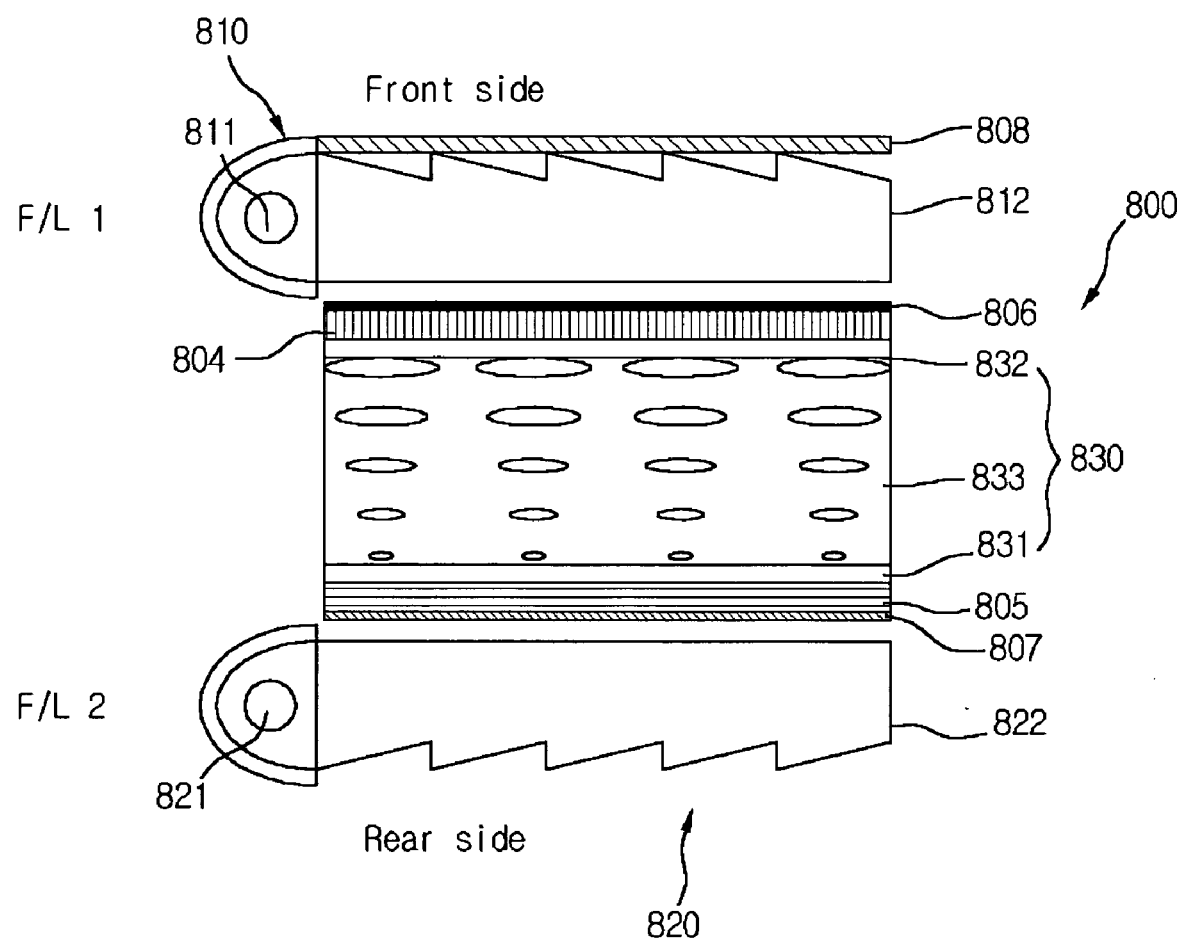
FIG. 8 shows a schematic cross sectional view of an exemplary LCD using dual light units according to a fourth embodiment of the invention.

FIG. 8 shows a schematic cross sectional view of an exemplary LCD using dual light units according to a fourth embodiment of the invention.

FIG. 8 shows an LCD 800 that includes a liquid crystal panel 830, which is formed by interposing a liquid crystal layer 833 between a first substrate 831 and a second substrate 832. First and second polarizing plates 804 and 805 are attached to opposing surfaces of the liquid crystal panel 830. A first front light unit 810 attaches to a front side of the liquid crystal panel 830, and a second front light unit 820 attaches to a rear side of the liquid crystal panel 830.

The LCD 800 also includes a first film 806 disposed between the first polarizing plate 804 and the first front light unit 810, a second film 807 disposed between the second polarizing plate 805 and the second front light unit 820, and a partial reflector 808 attached over a front surface of the first front light unit 810. The partial reflector 808 has and having a variable reflectivity.

Figure 9:
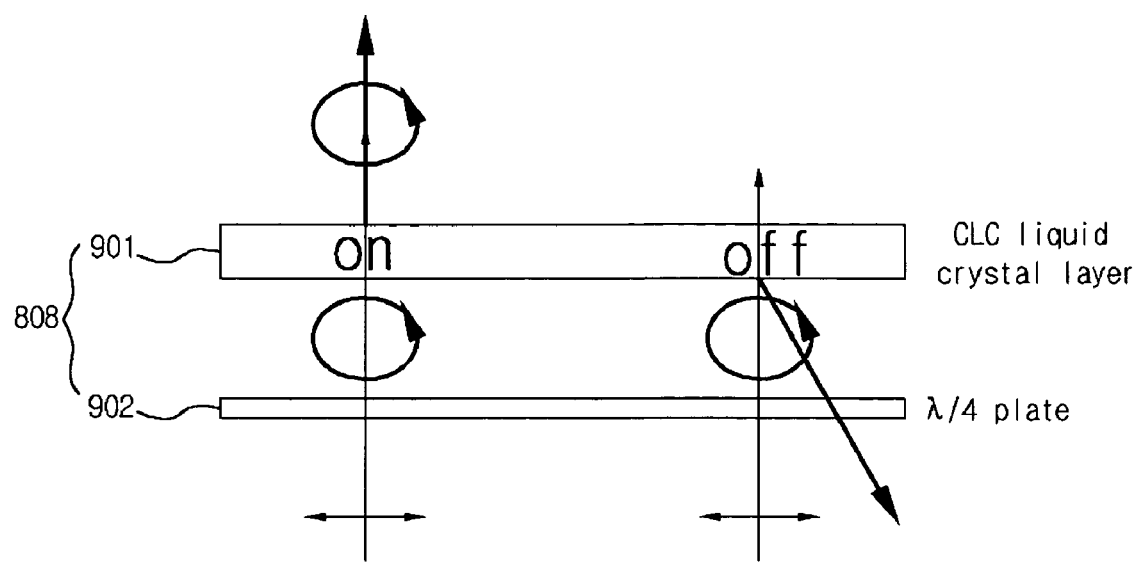
FIG. 9 shows a schematic view of a partial reflector having a varied reflection rate in an LCD using dual light units according to the invention.

The variably reflective partial reflector 808 may be exemplarily designed as shown in FIG. 9. However, the invention is not restricted to this design, and any appropriate variably reflective partial reflector can be used. FIG. 9 shows a schematic view illustrating the structure of the variably reflective partial reflector 808.

The partial reflector 808 shown in FIG. 9 is a reflector of which reflectivity is varied depending on an applied voltage. The partial reflector 808 may be prepared by coupling a cholesteric liquid crystal layer 901 and a λ/4 plate 902. The cholesteric liquid crystal layer 901 has a variable reflectivity varied depending on an applied voltage, and the λ/4 plate 902 converts a linear polarized light into a circularly polarized light, or converts a circular polarization into a linear polarization.

In the reflector, the reflectivity of the cholesteric liquid crystal layer 901 is varied depending on the applied voltage. That is, the magnitude of the applied voltage changes the pitch of the cholesteric liquid crystalline phase. When a main window corresponding to the rear side of the liquid crystal panel 830 is used, it is made to be in the Off-state, thereby obtaining a maximum reflectivity, which maximizes light efficiency and thus enhances brightness of the main window.

Also, when the sub-window corresponding to the front side of the liquid crystal panel 801 is used, it is made in On-state, thereby obtaining a maximum transmittance, which decreases light loss due to reflection, and minimizes power consumption due to the use of the second front light unit 820.

Each of the first front light unit 810 and the second front light unit 820 employs LED chips. Power consumption can be minimized by having a different number of the LED chips in the first front light unit 810 than the number of LED chips used in the second light unit 820.

For example, three LED chips are used in the first front light unit 810 for supplying light to the rear side of the liquid crystal panel 830, and two LED chips are used in the second front light unit 820 for supplying light to the front side of the liquid crystal panel 830 used as the sub-window. The ratio of chips in the first and second front light units is 3:2 (1.5), but any appropriate ratio and number of LED chips can be used.

Also, an equal number of LED chips may be applied to each of the first front light unit 810 and the second front light unit 820.

Additionally, the partial reflector 808 positioned at the front side of the liquid crystal panel 830 may be used as a mirror when the first front light unit 810 and the second front light unit 820 are in the Off-state.

The LCD 800 depicted in FIG. 8 has other elements that are similar in their functions to those in the LCD shown in FIGS. 3 through 5, and their detailed description will be omitted. FIG. 8 also shows a light source 811 provided in the first front light unit 810, and a light source 821 and a light guide plate 822 are provided in the second front light unit 820, respectively.

It will be apparent to those skilled in the art that various modifications and variations can be made in the liquid crystal display device using dual light units of the invention without departing from the spirit or scope of the invention. Thus, it is intended that the invention covers the modifications and variations of this invention provided they come within the scope of the appended claims and their equivalents.

What is claimed is:
1. An LCD comprising:
a liquid crystal panel;
first and second polarizing plates attached to opposing surfaces of the liquid crystal panel;
a first front light unit over a front side of the liquid crystal panel;
a second front light unit over a rear side of the liquid crystal panel;
a first film disposed between the first polarizing plate and the first front light unit, receiving a surrounding light and directing the surrounding light toward the rear side of the liquid crystal panel; and
a diffusion sheet disposed between the second polarizing plate and the second front light unit.

2. The LCD according to claim 1, wherein the first film is a reflective polarizing plate.

3. The LCD according to claim 1, wherein the first film is a DBEF (Dual Brightness Enhancement Film).

4. The LCD according to claim 3, wherein the DBEF receives light reflected by the liquid crystal panel according to the light's polarizing characteristics, and the DBEF again reflects the received light toward the liquid crystal panel.

5. The LCD according to claim 1, wherein the first film is a UBF (Ultra Brightness Film).

6. The LCD according to claim 5, wherein the UBF film receives an external surrounding light and directs the received external surrounding light toward the liquid crystal panel.

7. The LCD according to claim 1, wherein the first film functions as a mirror with respect to the front side of the liquid crystal panel when the first front light unit and the second front light unit are in an OFF state.

8. The LCD according to claim 1, further comprising a scattering film disposed between the first front light unit and the first film.

9. The LCD according to claim 1, wherein the first front light unit is operated to cause an image to be displayed on the rear side of the liquid crystal panel, and the second front light unit is operated to cause an image to be displayed on the front side of the liquid crystal panel.

10. The LCD according to claim 1, wherein the liquid crystal panel is formed in one mode selected from the group consisting of a TN mode, an ECB mode, and an OCB mode.

11. The LCD according to claim 1, wherein the first and second polarizing plates are over both surfaces of the liquid crystal panel such that optical axes of the first and second polarizing plates are perpendicular to each other.

12. The LCD according to claim 1, wherein each of the first front light unit and the second front light unit comprises at least one LED chip, and the number of the LED chips of the first front light unit is the same as the number of the LED chips of the second front light unit.

13. The LCD according to claim 1, wherein each of the first front light unit and the second front light unit comprises at least one LED chip, and the number of the LED chips of the first front light unit is different than the number of the LED chips of the second front light unit.

14. An LCD comprising:
a liquid crystal panel;
first and second polarizing plates attached to opposing surfaces of the liquid crystal panel;
a first front light unit over a front side of the liquid crystal panel;
a partial reflector over a front side of the first front light unit;
a second front light unit over a rear side of the liquid crystal panel;
a first film disposed between the first polarizing plate and the first front light unit, receiving a surrounding light and directing the surrounding light toward the rear side of the liquid crystal panel; and
a diffusion sheet disposed between the second polarizing plate and the second front light unit.

15. The LCD according to claim 14, wherein the first film is a reflective polarizing plate.

16. The LCD according to claim 14, wherein the first film is a DBEF (Dual Brightness Enhancement Film).

17. The LCD according to claim 16, wherein the DBEF receives a light reflected by the liquid crystal panel according to polarizing characteristics and again reflects the received light toward the liquid crystal panel.

18. The LCD according to claim 14, wherein the first film is a UBF (Ultra Brightness Film).

19. The LCD according to claim 18, wherein the UBF film receives an external surrounding light and directs the received external surrounding light toward the liquid crystal panel.

20. The LCD according to claim 14, further comprising a scattering film disposed between the first front light unit and the first film.

21. The LCD according to claim 14, wherein the partial reflector functions as a mirror with respect to the front side of the liquid crystal panel when the second front light unit is in an OFF state.

22. The LCD according to claim 14, wherein the partial reflector has a reflectivity of 50-90%.

23. The LCD according to claim 14, wherein the partial reflector is formed of a DBEF (dual brightness enhancement film).

24. The LCD according to claim 14, wherein the partial reflector is formed by coating a metallic material.

25. The LCD according to claim 14, wherein the partial reflector is formed to have a reflectivity that varies according to a supplied voltage.

26. The LCD according to claim 25, wherein the partial reflector comprises a cholesteric liquid crystal layer and a $\lambda/4$ plate.

27. The LCD according to claim 14, wherein each of the first front light unit and the second front light unit comprises at least one LED chip, and the number of the LED chips of the first front light unit is the same as the number of the LED chips of the second front light unit.

28. The LCD according to claim 14, wherein each of the first front light unit and the second front light unit comprises at least one LED chip, and the number of the LED chips of the first front light unit is different than the number of the LED chips of the second front light unit.

29. The LCD according to claim 14, wherein the first front light unit is operated to cause an image to be displayed on the rear side of the liquid crystal panel, and the second front light unit is operated to cause an image to be displayed on the front side of the liquid crystal panel.

30. The LCD according to claim 14, wherein the liquid crystal panel is formed in one mode selected from the group consisting of a TN mode, an ECB mode, and an OCB mode.

31. The LCD according to claim 14, wherein the first and second polarizing plates are over both surfaces of the liquid crystal panel such that optical axes of the first and second polarizing plates are perpendicular to each other.

* * * * *